United States Patent [19]
Duran

[11] Patent Number: 5,399,053
[45] Date of Patent: Mar. 21, 1995

[54] QUICK ACTION PANEL FASTENER ASSEMBLY INCLUDING A CUP ENCLOSED RETAINER RECEIVING A BOLT THEREIN

[75] Inventor: John A. Duran, Glendora, Calif.

[73] Assignee: Avibank Mfg., Inc., Burbank, Calif.

[21] Appl. No.: 54,042

[22] Filed: Apr. 27, 1993

[51] Int. Cl.⁶ .......................................... F16B 21/18
[52] U.S. Cl. ................................... 411/353; 411/105
[58] Field of Search ............... 411/353, 105, 517, 518, 411/519

[56] References Cited

U.S. PATENT DOCUMENTS

| | | | |
|---|---|---|---|
| 3,289,726 | 12/1966 | Sauter | 411/105 |
| 4,616,967 | 10/1986 | Molina | 411/105 |
| 4,747,738 | 5/1988 | Duran | 411/353 |
| 4,865,500 | 9/1989 | Duran et al. | 411/103 |
| 4,948,316 | 8/1990 | Duran et al. | 411/353 |
| 5,073,073 | 12/1991 | Chang | 411/105 |
| 5,172,500 | 12/1992 | Renski | 411/353 |

FOREIGN PATENT DOCUMENTS

1095051 12/1960 Germany ............................. 411/517
2319435 4/1973 Germany ............................. 411/517

Primary Examiner—Flemming Saether
Attorney, Agent, or Firm—Poms, Smith, Lande & Rose

[57] ABSTRACT

A fastener assembly for joining a panel to a sub-panel comprising a receptacle assembly having a threaded stud secured to the undersurface of the sub-panel. The assembly includes a bolt having an enlarged head at one end and a nose at the other end. The panel has a countersunk opening aligned with an opening in the sub-panel. The bolt is threaded for threaded engagement to the stud. The body of the bolt includes a plurality of spaced grooves extending longitudinally along the outer surface of the bolt body. A retainer surrounds the bolt body having spaced ears riding in the grooves and a stop in a groove adjacent the nose of the bolt stops the downward movement of the retainer. A cup member surrounds the retainer thereby protecting the retainer during its movement along the grooves.

32 Claims, 5 Drawing Sheets

QUICK ACTION PANEL FASTENER ASSEMBLY INCLUDING A CUP ENCLOSED RETAINER RECEIVING A BOLT THEREIN

FIELD OF THE INVENTION

The invention relates to quick action fasteners; and, more particularly, to improved quick action fasteners for panels of aircraft or the like.

DESCRIPTION OF THE PRIOR ART

Quick action fasteners are well known in the art. In U.S. Pat. No. 4,865,500, commonly assigned, there is described an improved quick action fastener having a retainer for retaining a bolt to a panel allowing the retainer to pass along the shank of the bolt body and hold the bolt in an up or extracted position. The retainer is a split ring or washer having inwardly extending ears or tabs which ride along slots or grooves in the bolt body. The retainer is stopped in its downward movement by either stops at the end of the slots or grooves in the bolt body or by a resilient stop ring mounted in a groove adjacent the nose of the bolt. The retainer, in one embodiment, is stopped in its upward movement by bumps in the slots or grooves in the bolt body which allow the split ring or washer retainer to pass thereover by expanding the latter but also allow the bolt to contract back to its original shape so as to be held in an up or extended position when disposed between the bumps and the resilient stop ring (or the stops at the end of the grooves). A similar arrangement is disclosed in U.S. Pat. No. 4,948,316, also commonly assigned.

In the foregoing arrangement, the split washer or ring retainer may become distorted over repeated use and a cutting edge might be created thereon which would damage the application.

There is thus a need to insure that the split ring or washer is always maintained flat and not over expanded beyond its elastic limits or capabilities. Further, such a retainer assembly should be able to be eliminate the need for a retaining ring or stop, if desired, and be usable without a grommet, as disclosed in U.S. Pat. No. 4,747,738, also commonly assigned.

SUMMARY OF THE INVENTION

It is an object of this invention to provide an improved quick action fastener assembly having a split ring retainer for retaining a bolt to a panel.

It is a further object of this invention to provide such an assembly wherein the split ring or washer is maintained flat and undistorted during numerous operations.

It is still another object of this invention to provide such an assembly which insures that the split ring or washer is not over expanded beyond its elastic limits or capability.

It is another object of this invention to carry out the foregoing objects using a split ring or washer assembly that can be used either without a grommet or with any suitable stop at the end of the bolt.

These and other objects are preferably accomplished by providing a fastener assembly for joining a panel to a sub-panel comprising a receptacle assembly having a threaded stud secured to the undersurface of the sub-panel. The assembly includes a bolt having an enlarged head at one end and a nose at the other end. The panel has a countersunk opening aligned with an opening in the sub-panel. The bolt is threaded for threaded engagement to the stud. The body of the bolt includes a plurality of spaced grooves extending longitudinally along the outer surface of the bolt body. A retainer surrounds the bolt body having spaced ears riding in the grooves and a stop in a groove adjacent the nose of the bolt stops the downward movement of the retainer. A cup or cover member surrounds the retainer thereby protecting the retainer during its movement along the grooves.

In this manner, the bolt may be disposed in the counter-sunk opening in the panel with the retainer on the blind side of the panel and the stop ring preventing movement of the retainer off of the bolt body thus retaining the bolt to the panel. The bolt can remain in the up or extracted portion while the panel is being attached to the installation. A plate may be provided on the underside of the panel trapping the retainer between the plate and the panel. The stop prevents downward movement of the bolt when in a hold out position with respect to the panel and restraining meaning on the bolt prevents inward movement of the bolt when in the hold out position with respect to the panel.

DESCRIPTION OF THE PREFERRED EMBODIMENT

Figure 1:
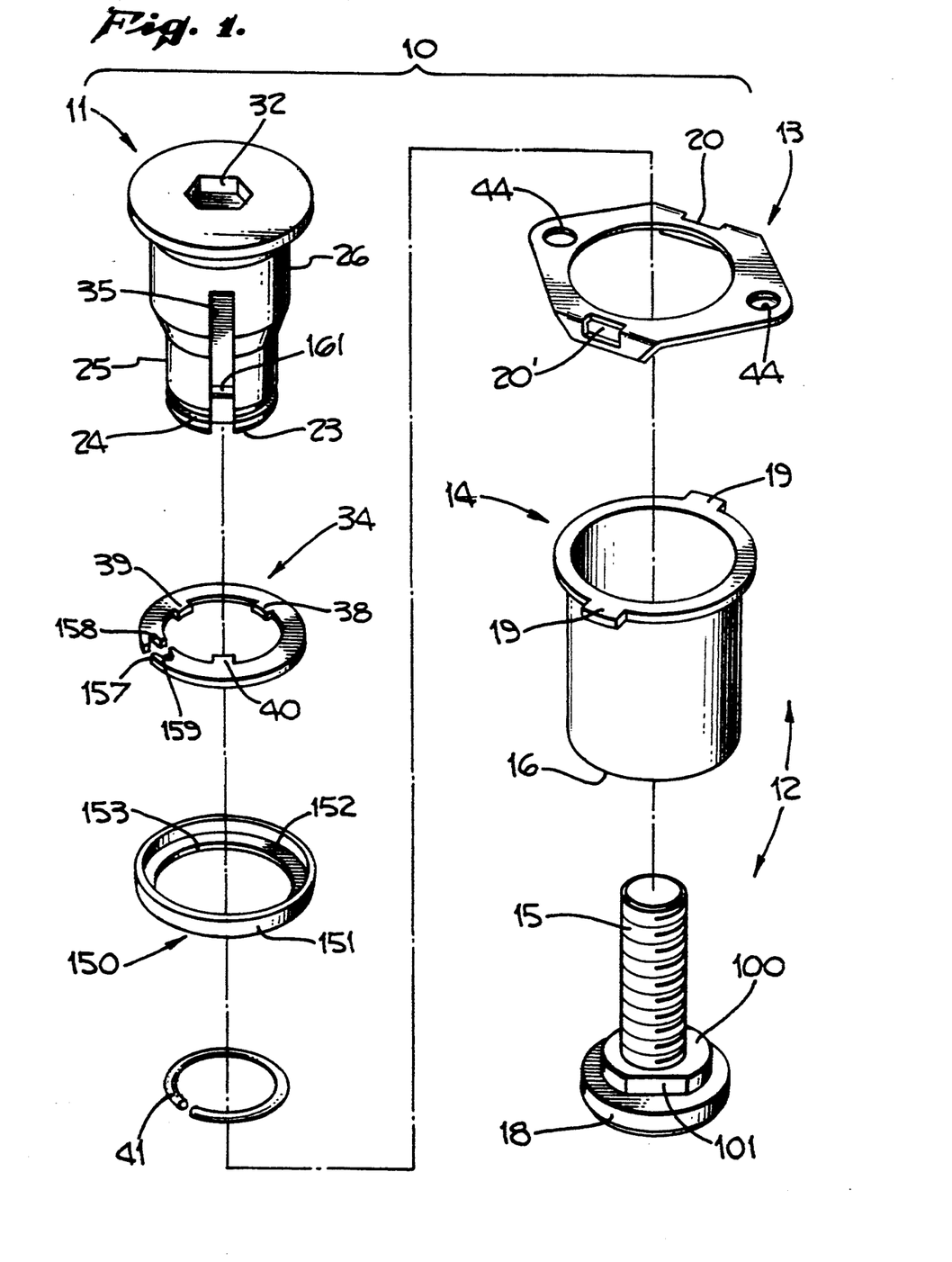
FIG. 1 is an exploded view of a fastener assembly in accordance with the teachings of the invention.
Figures 2, 3, 4:
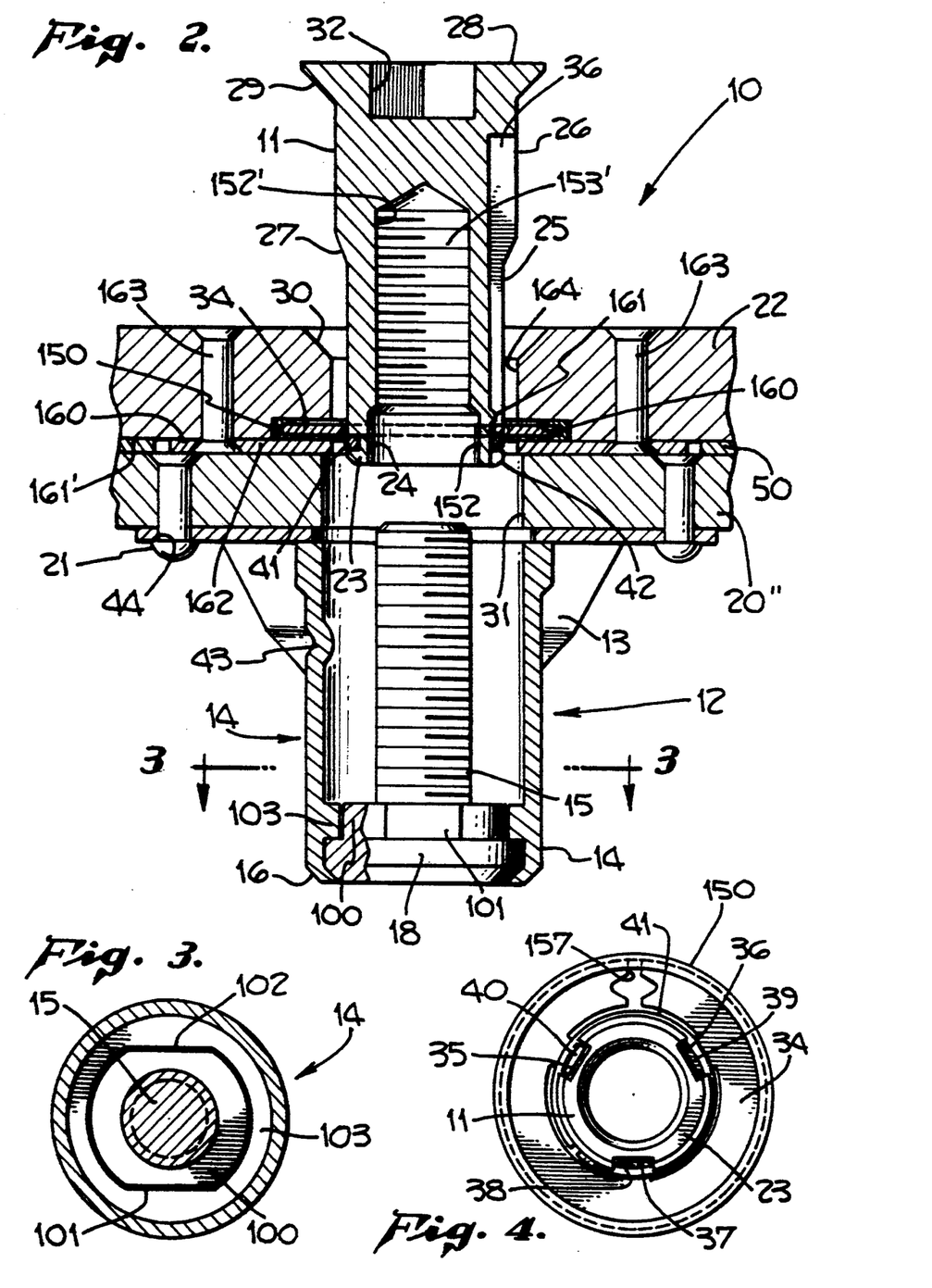
FIG. 2 is an elevational sectional view of the fastener assembly of FIG. 1 installed in a panel and abutting sub-panel.
FIG. 3 is a view taken along lines 3—3 of FIG. 2.
FIG. 4 is a view taken along lines 4—4 of FIG. 8.

Referring now to FIG. 1 of the drawing, there is shown a fastener assembly 10 comprising a bolt 11 adapted to mate with a receptacle assembly 12. Receptacle assembly 12 is comprised of a receptacle bracket or basket 13, a barrel 14 and an externally threaded stud 15. As seen in FIG. 2, the lower end 16 of barrel 14 is crimped about the base 18 of stud 15 to engage the stud 15 and connect the barrel 14 thereto. As seen in FIG. 1, the stud 15 has a boss 100 with flattened areas 101, 102, (see FIG. 3) as can be seen in U.S. Pat. No. 4,865,500, commonly assigned, the teachings of which are incorporated herein by reference.

As seen in FIG. 2, barrel 14 has an inwardly extending peripheral wall 103 configured similarly to boss 100 (FIG. 3). This is an anti-rotation feature preventing stud 15 from rotating within barrel 14 thereby allowing the stud 15 and barrel 14 to mate and lock and act as one unitary element. Of course, any type of self locking means may be used such as protrusions on the threads of bolt 11. Barrel 14 also includes tabs 19 (FIG. 1) which are inserted in a pair of slots 20, 20', formed in basket 13, thereby connecting the barrel 14 to basket 13. Slots 20, 20' are circumferentially greater in length than the width of tabs 19, thereby permitting the barrel 14 and stud 15 to rotate to a limited degree with respect to basket 13. Basket 13 is secured to substructure 20" (FIG. 2) by any suitable means, such as rivets 21. Although receptacle assembly 12 and basket 13 have been described as an assembly of individual components, obviously a single element may be used.

Bolt 11 is shown in FIG. 2 in its disengaged and withdrawn position with respect to panel 22.

Bolt 11 includes a nose 23, an annular groove 24 adjacent nose 23 and a generally cylindrical lower shank portion 25 (FIG. 2). Bolt 11 also includes an upper generally cylindrical shank portion 26 of an outer diameter substantially greater than the outer diameter of lower shank portion 25. A tapered portion 27 provides transition from upper shank portion 26 to lower shank portion 25. Bolt 11 has an enlarged head 28 at the upper end of shank portion 26, which head 28 is tapered at tapered portion 29 on its undersurface leading to shank portion 26. Head 28 is adapted to abut or bear against a countersunk opening 30 (FIG. 2) in panel 22 when threaded to stud 15 as will be discussed. Countersunk opening 30 in panel 22 is aligned with an opening 31 through sub-panel 20" as shown in FIG. 2. A hex socket 32 (see also FIG. 1) may be provided in head 28 as is well known in the art for receiving a suitable wrench therein. The interior surface 152' (FIG. 2) of bolt 11 is threaded 153'.

As seen in FIGS. 1 and 4, bolt 11 includes a plurality, such as three, of longitudinally extending slots or grooves 35 to 37 extending along the exterior thereof longitudinally and generally parallel to the longitudinal axis of bolt 11. These grooves 35 to 37 are preferably generally rectangular in cross-section and may be of a depth at least substantially equal to the inward extent of the three ears 38 to 40 of a flat annular washer or ring 34 as seen in FIG. 1.

Figure 5:
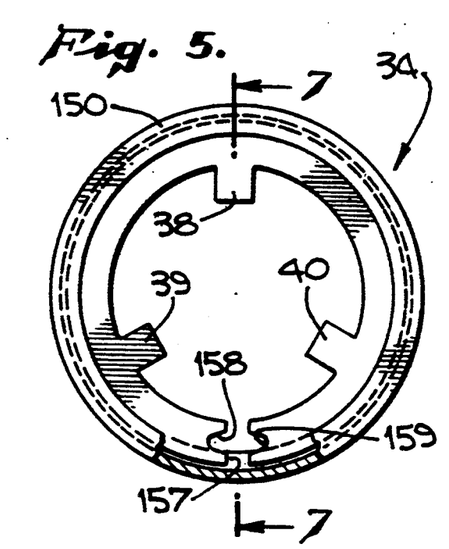
FIG. 5 is a top plan view of the assembled condition of the washer 34 and cup member 150 of FIG. 1.
Figure 6:
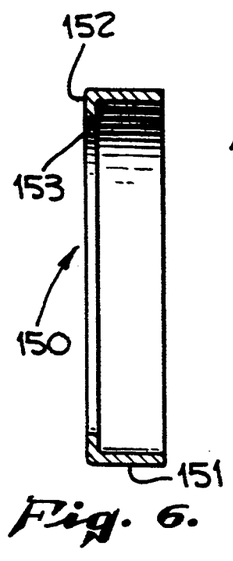
FIG. 6 is a side cross-sectional view of the cup 150 alone of FIG. 5 prior to swaging onto the washer or ring.
Figure 7:
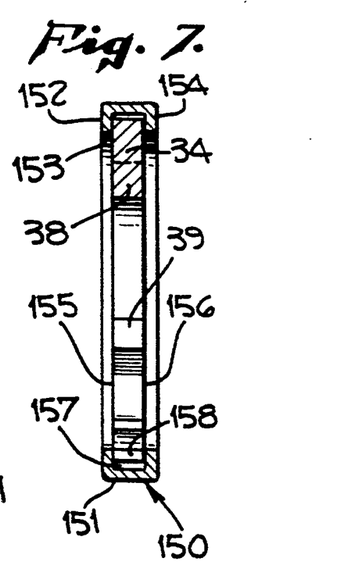
FIG. 7 is a view taken along lines 7—7 of FIG. 5.

Washer 34 is shown in plan view in FIG. 5. Washer 34 is adapted to mate with an annular cup member 150 as seen in FIGS. 1 and 6. FIG. 6 is a cross-sectional view of cup member 150 prior to assembly to washer 34. As can be seen, cup member 150 includes a peripheral annular wall 151 having a circular ring-shaped main body portion 152 surrounding hole or aperture 153. Washer 34 is adapted to be placed inside of cup member 150 with wall 151 swaged inwardly, as seen in FIG. 7, to trap washer 34 inside of cup member 150. This swaging forms a lip or flange 154, as seen in FIG. 7.

Also as seen in FIG. 7, washer 34 may be of a uniform thickness having generally flat inner and outer spaced surfaces 155, 156, respectively. Also, as seen in FIG. 1, washer 34 may be a split ring having an opening 157 with opposed slots 158, 159 (see FIG. 5). As seen in FIG. 7, cup member 150 extends only partway inwardly toward the center of washer 34 so that ears 38 to 40 can ride in grooves 35 to 37, as discussed in detail in U.S. Pat. No. 4,865,500.

Referring again to FIG. 1, bumps or protuberances 161 are formed within the slots or grooves 35 to 37 on the lower portion 25 of bolt 11.

As seen in FIG. 1, an annular resilient locking ring 41 is provided of a diameter adapted to pass over nose 23 of bolt 11 and snap-fit into groove 24. The nose 23 of bolt 11 may have a terminal tapered end 42 (FIG. 2) leading therein to facilitate assembly of ring 41 and guide the nose 23 of bolt 11 into the countersunk opening 30 through panel 22.

A counterbore 160 (FIG. 2) is provided on the blind or interior side 161' of panel 22 for receiving ring 34 and cup member 150 therein. A flat plate 50 is riveted, via rivets 163, or otherwise secured to the side 161' of panel 22. A gasket 162 provided between panel 22 and sub-panel 20". Thus, as seen in FIG. 2, the ring 34 and cup member 150 are trapped between the plate 50 and the gasket 162 and the panel 22.

The assembly of the elements of FIG. 1 will now be described. After formation of openings 30 and 31 through panel 22 and sub-panel 20", respectively, the receptacle assembly 12 is secured to the underside of sub-panel 20" by riveting basket 13 to panel 20" by rivets 21 passing through holes 44 (FIG. 1) in basket 13 and into sub-panel 20". The barrel 14 and stud 15 are secured thereto as heretofore described. One or more inwardly facing protrusions 43 (FIG. 2) may be provided on the exterior of barrel 14. These protrusions 43 provide a friction lock between the internal surface of barrel 14 and the exterior of bolt 11. Of course, any suitable thread lock as is known in the art may be used, such as a plastic insert installed through the side of barrel 14 or protrusions on the threads of the bolt.

Bolt 11 is now inserted through countersunk opening 30 and through hole 164. Ring 34 and cup member 150, assembled as in FIG. 7, are mounted to bolt 11 with ears 38 to 40 entered grooves 35 through 37, respectively (FIG. 4). Retaining ring 41 is snap-fitted over nose 23 and into groove 24 as heretofore described. Thus, ring 34 and cup member 150 cannot move off of bolt 11 because of their engagement with ring 41 (ears 38 to 40 abutting against ring 41 in its downwardly movement—see FIG. 2) nor move up past enlarged head 29. Plate 50 and gasket 162 is installed against panel 22. Thus, bolt 11 is trapped in opening 30 in panel 22 with ring 34 and cup member 150 trapped between plate 50 and panel 22.

The retaining ring 34, trapped within cup member 150, expands and contracts as it moves over the bumps 161 in the slots 35 to 37 because of the slot 157 in ring 34. As the retaining ring 34 moves from the FIG. 8 to the FIG. 9 position over the bumps 161, and stops against the retaining ring 41 (FIG. 2), the slot 157 opens wider than shown in FIGS. 1 and 5, then closes back to the FIGS. 1 and 5 position, and ring 34 remains trapped between plate 50, gasket 162 and panel 22 as seen in FIG. 2.

Sub-panel 20" may now be brought into position abutting against panel 22 and bolt 11 may be threaded to stud 15 on the receptacle assembly 12. Thus, sub-panel 20" is releasably secured to panel 22. The ring 34 and cup member 150 ride in grooves 35 to 37 up and down over the differing diameter sections of bolt 11 as heretofore described.

Figures 8, 9, 10:
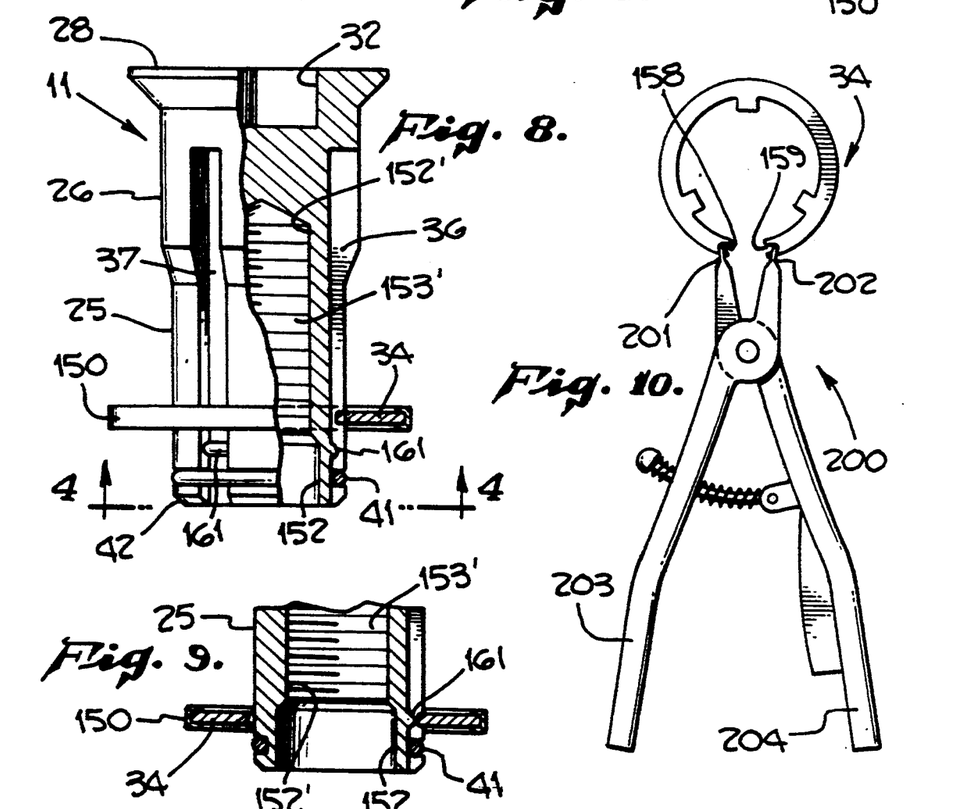
FIG. 8 is an elevational view, partly in section, of the bolt of FIG. 1 with the resilient ring 41, washer 34 and cup member 150 mounted thereon.
FIG. 9 is a view similar to a portion of the view of FIG. 8 showing one step in the functioning of the parts of FIG. 8.
FIG. 10 is a perspective view of a conventional tool used to open the washer or ring 34 of FIG. 1 prior to installation on bolt 11.

As seen in FIG. 8, the flat washer or ring 34 and cup member 150 are shown disposed within grooves 35 to 37 above bumps 161. Ring 34 slides over bumps 161 (FIG. 7) and stops against the retaining ring 41. This is the position shown in FIG. 2. In this manner, the bolt 11 remains in the up or extracted position shown in FIG. 2 while the panel 22 may be either abutting against panel 20", as shown in FIG. 2, or moved away therefrom, or bolt 11 may even be mounted in panel 22 prior to connection to the aircraft or other installation in which the panel 22 is mounted. The washer or annular ring 34 and cup member 150 remain trapped between bumps 161 and ring 41, as seen in FIG. 2, not only holding bolt 11 in the hold out position, but ensuring it can't move back inwardly.

By blanketing washer or ring 34 inside of cup member 150, the tendency of ring 34 to distort and create a cutting edge, which might damage the washer or ring 34, is avoided. The washer or ring 34 is always maintained flat due to the blanketing by cup member 150. Cup member 150 also insures that washer or ring 34 is not over expanded beyond its elastic limits or capability during use.

The ring 34 and cup member 150 assembly may be installed in any suitable manner, for example, a conventional assembly pliers tool 200 such as illustrated in FIG. 10. Tool 200 has prongs 201, 202 that enter within slots 158, 159 of washer or ring 34. As handle portions 203, 204 are squeezed closed, the prongs 201, 202 move outwardly within slots 158, 159 expanding washer or ring 34. This allows the washer or ring 34 to be installed onto bolt 11. One method of installation is to slightly tilt washer or ring 34 during installation so that one of the ears 38 to 40 is in one of the slots 35 to 37 of bolt 11. Tool 200 is now squeezed, with prongs 201, 202 disposed within slots 158,159, to separate the two remaining ears 38 to 40 of washer or ring 34 so that the latter may be installed in the two remaining slots 35 to 37 of bolt 11.

A suitable internal-type assembly pliers tool that may be used is Model No. 0900 and 1100 sold by Waldes of Truarc, Inc.

Although a special tool has been disclosed, obviously a small screwdriver blade or the like may be inserted under washer 34 while simultaneously tilting washer 34 onto bolt 11 thereby installing ears 38 to 40 in grooves 35 to 37.

Figures 11, 12, 13, 14, 15:
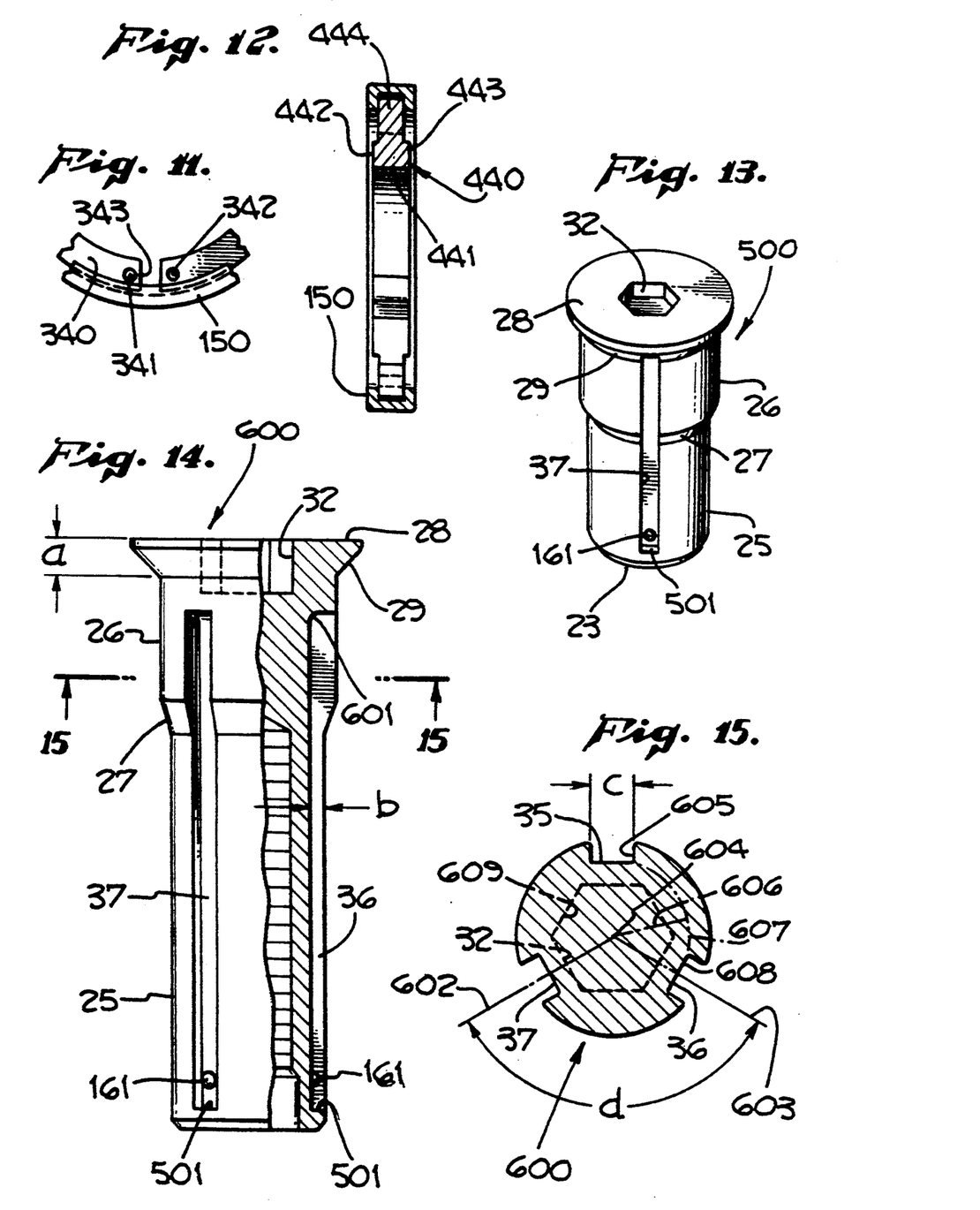
FIG. 11 is a plan view of a portion of a modification of the ring or washer 34 of FIG. 5.
FIG. 12 is a side cross-sectional view, similar to FIG. 7, illustrating a modification of the ring or washer 34 of FIGS. 5 and 7.
FIG. 13 is a perspective view of a modification of the bolt 11 of FIG. 1.
FIG. 14 is an elevational view, partly in section, of a modification of the bolt alone of FIG. 1.
FIG. 15 is a view taken along lines 15-15 of FIG. 14.

Although washer 34 has been disclosed as having slots 158, 159 into which the prongs 201, 202 of tool 200 are inserted, as seen in FIG. 11, wherein like numerals refer to like parts of the washer 34 and cup member 150 of FIG. 5, washer or ring 340 has a split or slot 343. However, instead of installation slots 158, 159, a pair of holes 341, 342 are provided into which the prongs 201, 202 of tool 200 may be inserted.

Another modification of the cup member 150 and ring or washer 34 is shown in FIG. 12 wherein again like parts refer to like parts of the embodiment of FIGS. 5 to 7. Here, cup member 150 blankets washer or ring 440 which washer or ring 440 has a central main body portion 441, with flat parallel spaced surfaces 442, 443 on each side. The outside portion 444 of ring or washer 440 is stepped, as seen in FIG. 12, with cup member 150 blanketing the outside portion 444 as shown. This results in a thinner washer or ring.

Although bolt 11 is shown as having a stop ring 41 mounted in groove 24, a bolt having a stop at the end of each slot 35 to 37 may be used, as in my U.S. Pat. No. 4,747,738, commonly assigned, the teachings of which are incorporated herein by reference.

Thus, as seen in FIG. 13, wherein like numerals refer to like parts of the bolt 11 of FIG. 1, bolt 500 is shown. Slot 37 (and slots 35, 36 not visible in FIG. 13) terminates at the bottom in an end wall or stop 501. This eliminates the need for stop ring 41 and groove 24. Reference may be made to FIG. 3 of U.S. Pat. No. 4,747,738 for an illustration of how the terminal end 501 of the slots 35 to 37 would function to stop the downward movement of a washer or ring, such as washer or ring 34 off of a bolt, as bolt 11. The grommet 22 of U.S. Pat. No. 4,747,738 may be eliminated.

Bolt 600 in FIG. 14 is similar to bolt 500 of FIG. 13 and like numerals refer to like parts of FIG. 13. However, bolt 600 may have specific dimensions to function efficiently with the ring or washer 34 and cup member 150 of FIG. 1 and the modifications thereof. Thus, as seen in FIG. 14, the depth a of taper 29 may be about 0.072 inches, with a tolerance of about ±0.005 inches. The radius of curvature of the end corners, such as corner 601, may be approximately between 0.020 and 0.025 inches. The depth b of each slot 35 to 37 (slot 36 not visible in FIG. 14—see FIG. 15) may be about 0.040 inches measured in the grip region. The width c (FIG. 15) of each slot 35 to 37 may be about 0.068 inches. The angle d formed between two adjacent slots 35 to 37, defined by lines 602 and 603, extending from the axial center line 604 of bolt 600 and through the midpoint of each respective slot 35 to 37 (slots 35, 37, respectively, being illustrated in FIG. 15) may be about 120°. The radius of curvature of the inside corners 605 of each slot 35 to 37 may be between about 0.003 and 0.007 inches. The radius 606 from point 604 to a line 607 passing through the back walls 608 of each slot 35 to 37 may be about 0.145 inches. Finally, as seen in FIG. 15, the plane of the back walls 608 of each slot 35 to 37 are generally parallel to the hexagonal recess flats 609 of the hex-shaped cavity 32 of the head of bolt 600 adjacent and spaced from each respective slot 35 to 37. These specific dimensions enhance the mechanical properties of the bolt 600. The operation and assembly of bolt 600 to the remaining parts, as seen in the embodiment of FIG. 1, and the functioning of the same are identical to the assembly and functioning of parts of the embodiment of FIG. 1 as heretofore described.

Figure 16:
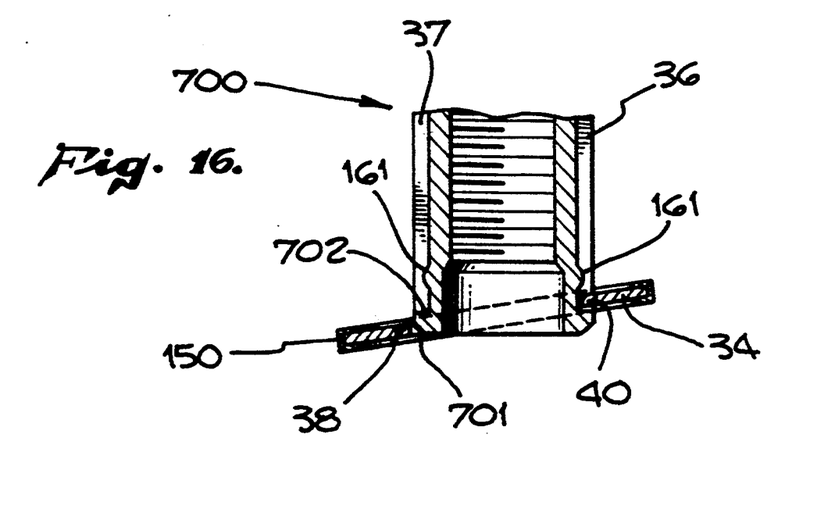
FIG. 16 is an elevational view similar to FIG. 9 showing another method of installing a washer and cup member on a bolt.
Figure 17:
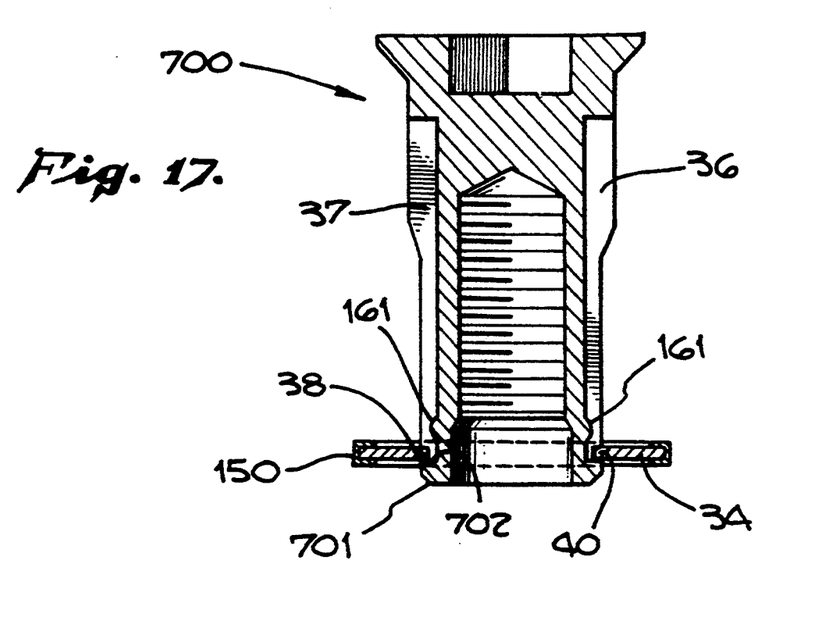
FIG. 17 is a view similar to FIG. 16 showing the final installed position.

Another way in which washer 34 can be installed manually on bolt 11 without need for a tool such as tool 200, or even a screwdriver, is illustrated in FIG. 16. A portion of bolt 700 is shown, otherwise identical to bolt 11, having bumps 161 in grooves or slots 35 to 37 as heretofore described. The nose 701 of bolt 700 is radiused providing a tapered nose leading into end wall or stop 702. Washer 34 and assembled cup member 150 is tilted to put two tangs or ears into grooves 36 and 35 (latter not visible in FIG. 16), then pushing the third tang 38 over the nose 701 of bolt 700. The final installed position is shown in FIG. 17.

It can be seen that I have described a quick action fastener which enables a washer or ring and cup member assembly to be quickly installed thereon which assembly can then ride in the slots of the bolt of the fastener, expand and contract as the washer or ring of the assembly moves over bumps in the bolt slots without distortion of the washer or ring of the assembly or forming cutting edges on the same. The washer or ring of the assembly is always maintained flat due to the cup member of the assembly. The cup member of the assembly insures that the ring or washer of the assembly is not over expanded beyond its elastic limits or capabilities. The need for a retaining ring mounted in a groove adjacent the nose of the bolt, as required in U.S. Pat. Nos. 4,865,500 and 4,948,316, may be eliminated. There is no need for a grommet as required in U.S. Pat. No. 4,747,738. Finally, specific dimensions may be applied to the bolt to enhance the mechanical properties of the same.

I claim:

1. In a fastener assembly for joining a panel to a sub-panel comprising a receptacle assembly having a threaded stud secured to the undersurface of the sub-panel, a bolt having an enlarged head at one end and a nose at the other end, said nose being adapted to extend through a countersunk opening in said panel coaxially aligned with an opening in said sub-panel with the stud of said receptacle assembly coaxially aligned with both of said openings, said bolt being internally threaded for threaded engagement to said stud, a flat retainer having indexing means extending inwardly toward the center thereof, said bolt having guide means extending longitudinally along the outer surface thereof receiving therein said indexing means for guiding said retainer along the body of said bolt, a plate secured to the underside of said panel trapping said retainer between the panel and said plate, and restraining means associated with said bolt comprising two discrete elements on said bolt separated by a relatively smooth outer surface portion of said bolt guide means, one of said elements positively arresting the downward movement of said retainer indexing means along said guide means and the other of said elements disposed in the path of movement of said retainer indexing means and yieldably engagable thereby for impeding the upward movement of said retainer along said guide means upon positive engagement between said retainer and said other of said elements thereby retaining said bolt of said panel in an up or extracted position when said bolt is disengaged from said stud, the improvement which comprises:

said retainer being a split ring having two ends with a split therebetween and enclosed in a cup member, said cup member being one integral piece having a peripheral wall surrounding said retainer and inwardly extending spaced upper and lower flanges integral with said wall encompassing said retainer with said retainer spaced between said upper and lower flanges, said plate abutting against said cup member, said split ring having an engagement means at each end for engagement by a tool to enable the removal of the split ring and cup member together from the bolt.

2. In the assembly of claim 1 wherein said guide means include a plurality of spaced slots and said retainer is an annular ring having a plurality of inwardly extending spaced ears riding in said slots, said cup member being generally circular with said peripheral wall being circular, and said flanges being ring-shaped and integral with said peripheral wall.

3. In the assembly of claim 2 wherein said flanges extend inwardly toward the central axis of said ring but spaced therefrom and from said ears whereby said ears are free to slide in said slots.

4. In the assembly of claim 2 wherein said ring has a first inner main portion having said ears extending therefrom and an outer integral portion of lesser thickness than said first inner main portion surrounding said inner main portion.

5. In the assembly of claim 4 wherein said one of said elements is a stop at the end of each guide means.

6. In the assembly of claim 1 wherein said engagement means includes a pair of opposed slots.

7. In the assembly of claim 1 wherein said engagement means includes a pair of opposed holes.

8. In the assembly of claim 1 wherein the depth of the head of said bolt is about 0.072 inches.

9. In the assembly of claim 8 wherein the head of said bolt is tapered on its undersurface.

10. In the assembly of claim 9 wherein said guide means are slots having a radius of curvature of between about 0.020 and 0.025 inches where said guide means intersect the head of said bolt.

11. In the assembly of claim 1 wherein said guide means are slots and the depth of said slots is about 0.040 inches.

12. In the assembly of claim 11 wherein the width of said slots is about 0.068 inches.

13. In the assembly of claim 1 wherein said guide means includes a plurality of spaced slots and the angle formed between any two adjacent slots defined by a first line extending from the axial centerline of said bolt through the midpoint of a first slot and a second line extending from the axial centerline of said bolt through the midpoint of a second slot adjacent said first slot is about 120°.

14. In the assembly of claim 1 wherein said guide means includes a plurality of spaced slots and the radius of curvature of the inner corners of each slot is between about 0.003 and 0.007 inches.

15. In the assembly of claim 1 wherein said guide means includes a plurality of spaced slots, each having a back wall and spaced side walls, the radius defined by a line extending from the axial centerline of said bolt to a line passing through the back walls of said slots is about 0.145 inches.

16. In the assembly of claim 1 wherein said bolt has a hexagonally shaped cavity forming six sides in said head, said guide means including a plurality of spaced slots, each having a back wall and spaced side walls, said back walls being spaced from and parallel to one of said hex-shaped sides forming said cavity.

17. In a fastener assembly for joining a panel to a sub-panel comprising a receptacle assembly having a threaded stud adapted to be secured to the undersurface of a sub-panel, a bolt having an enlarged head at one end and a nose at the other end, said nose being adapted to extend through a countersunk opening in said panel coaxially aligned with an opening in said sub-panel with the stud of said receptacle assembly coaxially aligned with both of said openings, said bolt being threaded for threaded engagement to said stud, a flat retainer having indexing means extending inwardly toward the center thereof, said bolt having guide means extending longitudinally along the outer surface thereof receiving therein said indexing means for guiding said retainer along the body of said bolt, restraining means associated with said bolt comprising two discrete elements on said bolt separated by a relatively smooth outer surface portion of said bolt for arresting the downward movement of said retainer along said guide means and for impeding the upward movement of said retainer along said guide means thereby being adapted to retain said bolt in an up or extracted position when said bolt is disengaged from said stud, the improvement which comprises:

said retainer being a split ring having tow ends with a split therebetween enclosed in a cup member, said cup member being one integral piece having a peripheral wall surrounding said retainer and inwardly extending spaced upper and lower flanges integral with said wall encompassing said retainer with said retainer spaced between said upper and lower flanges, said split ring having an engagement means at each end for engagement by a tool to enable the removal of the split ring and cup member together from the bolt.

18. In the assembly of claim 17 wherein said guide means include a plurality of spaced slots and said retainer is an annular ring having a plurality of inwardly extending spaced ears riding in said slots, said cup member being generally circular with said peripheral wall being circular and said flanges being ring-shaped and integral with said peripheral wall.

19. In the assembly of claim 18 wherein said flanges extend inwardly toward the central axis of said ring but spaced therefrom and from said ears whereby said ears are free to slide in said slots.

20. In the assembly of claim 18 wherein said ring has a first inner main portion having said ears extending therefrom and an outer integral portion of lesser thickness than said first inner main portion surrounding said inner main portion.

21. In the assembly of claim 20 wherein said one of said elements is a stop at the end of each guide means.

22. In the assembly of claim 18 wherein said engagement means includes a pair of opposed slots.

23. In the assembly of claim 18 wherein said engagement means includes a pair of opposed holes.

24. In the assembly of claim 17 wherein the depth of the head of said bolt is about 0.072 inches.

25. In the assembly of claim 24 wherein the head of said bolt is tapered on its undersurface.

26. In the assembly of claim 25 wherein said guide means are slots having a radius of curvature of between about 0.020 and 0.025 inches where said guide means intersect the head of said bolt.

27. In the assembly of claim 17 wherein said guide means are slots and the depth of said slots is about 0.040 inches.

28. In the assembly of claim 27 wherein the width of said slots is about 0.068 inches.

29. In the assembly of claim 17 wherein said guide means includes a plurality of spaced slots and the angle formed between any two adjacent slots defined by a first line extending from the axial centerline of said bolt through the midpoint of a first slot and a second line extending from the axial centerline of said bolt through the midpoint of a second slot adjacent said first slot is about 120°.

30. In the assembly of claim 17 wherein said guide means includes a plurality of spaced slots and the radius of curvature of the inner corners of each slot is between about 0.003 and 0.007 inches.

31. In the assembly of claim 17 wherein said guide means includes a plurality of spaced slots, each having a back wall and spaced side walls, the radius defined by a line extending from the axial centerline of said bolt to a line passing through the back walls of said slots is about 0.145 inches.

32. In the assembly of claim 17 wherein said bolt has a hexagonally shaped cavity forming six sides in said head, said guide means including a plurality of spaced slots, each having a back wall and spaced side walls, said back walls being spaced from and parallel to one of said hex-shaped sides forming said cavity.

* * * * *